United States Patent
Yoon (10) Patent No.: US 9,002,296 B2
(45) Date of Patent: Apr. 7, 2015

(54) COMMUNICATION TERMINAL HAVING TDD SWITCH WITH ISOLATING FUNCTION AND DRIVING METHOD THEREOF

(75) Inventor: Hyun Su Yoon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 187 days.

(21) Appl. No.: 13/809,075

(22) PCT Filed: Aug. 1, 2011

(86) PCT No.: PCT/KR2011/005652
§ 371 (c)(1),
(2), (4) Date: Jan. 8, 2013

(87) PCT Pub. No.: WO2012/018213
PCT Pub. Date: Feb. 9, 2012

(65) Prior Publication Data
US 2013/0122832 A1    May 16, 2013

(30) Foreign Application Priority Data
Aug. 3, 2010    (KR) .................. 10-2010-0074860

(51) Int. Cl.
*H04B 1/46*    (2006.01)
*H04B 1/44*    (2006.01)
*H04B 1/56*    (2006.01)

(52) U.S. Cl.
CPC ... *H04B 1/44* (2013.01); *H04B 1/56* (2013.01)

(58) Field of Classification Search
CPC .................................. H04B 1/44; H04B 1/56
See application file for complete search history.

(56) References Cited

U.S. PATENT DOCUMENTS

| | | | | |
|---|---|---|---|---|
| 6,961,368 | B2 * | 11/2005 | Dent et al. | 375/219 |
| 2004/0248529 | A1 * | 12/2004 | Park | 455/127.1 |
| 2005/0042989 | A1 * | 2/2005 | Ho | 455/78 |
| 2008/0238569 | A1 * | 10/2008 | Matsuo | 333/32 |
| 2008/0252518 | A1 * | 10/2008 | Yeshayahu | 342/357.02 |

FOREIGN PATENT DOCUMENTS

| | | |
|---|---|---|
| KR | 100469500 | 2/2005 |
| KR | 2020100006253 | 6/2010 |
| WO | WO 0051257 | 8/2000 |

OTHER PUBLICATIONS

PCT/ISA/237 Written Opinion issued on PCT/KR2011/005652 (pp. 4).
PCT/ISA/210 Search Report issued on PCT/KR2011/005652 (pp. 3).

* cited by examiner

*Primary Examiner* — Edward Urban
*Assistant Examiner* — Mohammed Rachedine
(74) *Attorney, Agent, or Firm* — The Farrell Law Firm, P.C.

(57) ABSTRACT

A communication terminal and a driving method thereof are provided. The driving method of a communication terminal includes: forming a transmitting path and an absorption path by controlling a time division duplex (TDD) switch in a transmitting mode to isolate the transmitting path and the receiving path from an absorption path, the transmitting path transmitting a transmitting signal in a wireless scheme, and the absorption path diverged from the transmitting path through a circulator of the TDD switch to block a reflecting signal in the transmitting signal reversely transferred to the transmitting path; processing the transmitting signal through the transmitting path. Because a TDD switch has an isolation function, insertion loss in a transmitting path may be suppressed.

12 Claims, 5 Drawing Sheets

COMMUNICATION TERMINAL HAVING TDD SWITCH WITH ISOLATING FUNCTION AND DRIVING METHOD THEREOF

TECHNICAL FIELD

The present invention relates to a communication terminal and a driving method thereof, and more particularly, to a communication terminal having a time division duplex (TDD) switch with an isolation function and a driving method thereof.

BACKGROUND ART

In general, a radio frequency (RF) communication system performs communication according to a Frequency Division Duplexing (FDD) access scheme or a Time Division Duplexing (TDD) access scheme. The FDD access scheme divides and uses a total frequency band in an RF communication system into a frequency domain for uplink and a frequency domain for downlink. Meanwhile, the TDD access scheme divides a predetermined time interval into a time domain for uplink and a time domain for downlink, and uses a total frequency band in the respective time domains. Through this, according to the TDD access scheme, transmission efficiency may be relatively improved in an RF communication system, and a rate of a resource allotted to uplink and downlink may be easily controlled.

Figure 1:
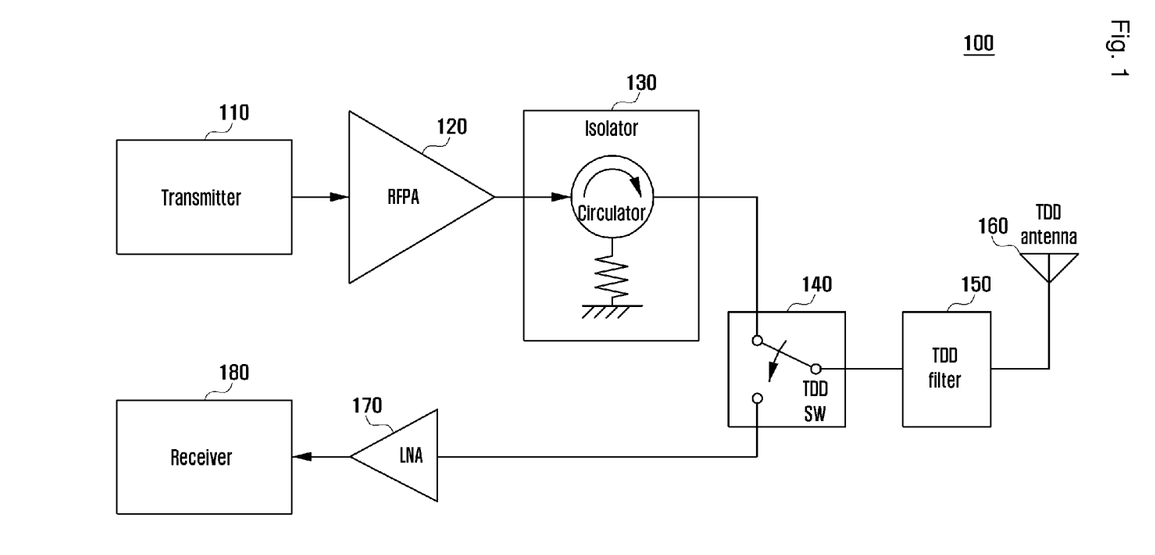
FIG. 1 is a block diagram illustrating a configuration of a conventional communication terminal.

Accordingly, in the RF communication system supporting the TDD access scheme, as shown in FIG. 1, a communication terminal 100 may control a transmitting path for uplink and a receiving path for downlink to use the TDD access scheme. At this time, the transmitting path may be formed via a transmitter 110, a Radio Frequency High Power Amplifier (RFPA) 120, an isolator 130, a TDD Switch (SW) 140, a TDD filter 150, and a TDD Antenna 160. The receiving path may be formed via the TDD antenna 160, the TDD filter 150, the TDD SW 140, a Low Noise Amplifier (LNA) 170, and a receiver 180. Here, the TDD switch 140 may block physical connection between the transmitting path and the receiving path.

DISCLOSURE OF INVENTION

Technical Problem

However, in the communication terminal, insertion loss is relatively high on the transmitting path. Owing to this, the RFPA 120 requires output according to higher power in the communication terminal. Accordingly, upon operation of the communication terminal, power consumption and a calorific value are increased.

Solution to Problem

The present invention has been made in view of the above problems, and suppresses insertion loss on a transmitting path in a communication terminal.

The present invention further reduces power for output of an RFPA in a communication terminal.

The present invention further reduces power consumption required for an operation of a communication terminal and a calorific value according to an operation of the communication terminal.

In accordance with an aspect of the present invention, a communication terminal includes: an antenna transmitting and receiving a transmitting signal and a receiving signal in a wireless scheme, respectively; a transmitter processing and transmitting the transmitting signal to the antenna; a receiver receiving and processing the receiving signal from the antenna; and a time division duplex (TDD) switch disposed between the transmitter and the receiver, and blocking electric connection between the transmitter and the receiver.

The TDD switch forming a transmitting path between the transmitter and the antenna in a transmitting mode includes: a circulator diverging an absorption path for blocking a reflecting signal in the transmitting signal reversely transferring to the transmitting path from the transmitting path, and forms a receiving path connecting the antenna, the circulator, and the receiver in a receiving mode.

In accordance with another aspect of the present invention, a driving method of a communication terminal includes: forming a transmitting path and an absorption path by controlling a time division duplex (TDD) switch in a transmitting mode to isolate the transmitting path and the receiving path from an absorption path, the transmitting path transmitting a transmitting signal in a wireless scheme, and the absorption path diverged from the transmitting path through a circulator of the TDD switch to block a reflecting signal in the transmitting signal reversely transferred to the transmitting path; and processing the transmitting signal through the transmitting path.

In accordance with another aspect of the present invention, a driving method of a communication terminal further includes: controlling the TDD switch to form the receiving path from the circulator such that the transmitting signal is blocked in the transmitting path and the absorption path when the transmitting mode is converted to the receiving mode; and processing a signal received through the receiving path.

Advantageous Effects of Invention

Therefore, in a communication terminal and a driving method thereof according to the present invention, a TDD switch may diverge an absorption path from a transmitting path in a transmitting mode of a communication terminal, and remove a reflecting signal in the transmitting signal reversely provided to the transmitting path to protect an RFPA of a transmitting from the reflecting signal. In a transmitting mode of the communication terminal, a TDD switch may isolate a receiving path from a transmitting path and an absorption path to protect an RFPA of the receiving path from a transmitting signal or a reflecting signal. This may improve transmitting performance of the communication terminal. In a receiving mode of the communication terminal, a TDD switch may isolate a transmitting path and an absorption path from a receiving path to protect an LNA of the receiving path from a noise introduced from the transmitting path. This may improve receiving performance of the communication terminal. Accordingly, because a TDD switch in a communication terminal has an isolation function, there is not a need for a separate isolator to reduce insertion loss in a transmitting path. Owing to this, power for output of an RFPA in a communication terminal may be reduced. Further, power consumption required for an operation of the communication terminal may be reduced and a calorific value according to an operation of the communication terminal may be reduced.

BRIEF DESCRIPTION OF DRAWINGS

The objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

As used herein, the term "transmitting mode" means a mode executed corresponding to a time domain for uplink in a communication terminal. As used herein, the term "receiving mode" means a mode executed corresponding to a time domain for downlink in a communication terminal. As used herein, the term "transmitting signal" means a signal that a communication terminal transmits through uplink in a transmitting mode. As used herein, the term "received signal" means a signal received by a communication terminal through downlink in a receiving mode. At this time, the signal may refer to control information or data.

Figure 2:
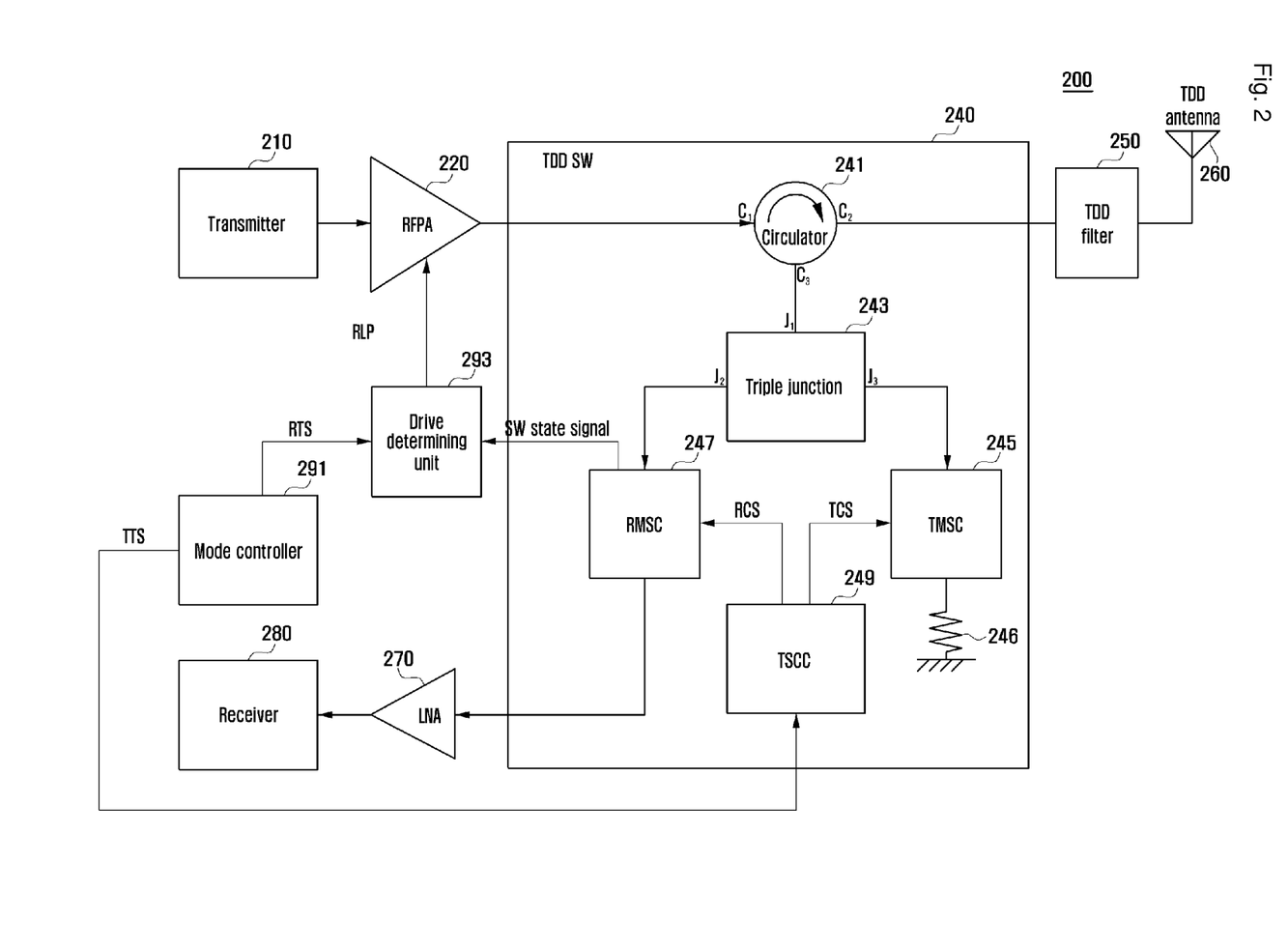
FIG. 2 is a block diagram illustrating a configuration of communication terminal according to an exemplary embodiment of the present invention.

FIG. 2 is a block diagram illustrating a configuration of a communication terminal according to an exemplary embodiment of the present invention.

Referring to FIG. 2, a communication terminal 200 of this embodiment includes a transmitter 210, an RFPA 220, a TDD switch 240, a TDD filter 250, a TDD antenna 260, an LNA 270, a receiver 280, a mode controller 291, and a drive determining unit 293. At this time, a transmitting path may be formed through the transmitter 210, the RFPA 220, the TDD switch 240, the TDD filter 250, and the TDD antenna 260. A receiving path may be formed through the TDD antenna 260, the TDD filter 250, the TDD switch 240, the LNA 270, and the receiver 280.

The transmitter 210 generates a transmitting signal. At this time, the transmitter 210 may encode and modulate the transmitting signal. Here, the transmitter 210 may include an encoder and a modulator.

The RFPA 220 amplifies the transmitting signal. At this time, the RFPA 220 amplifies the transmitting signal in an RF high power state. That is, the RFPA 220 up-converts a frequency of a transmitted signal and amplifies power for outputting the transmitting signal.

The TDD switch 240 provides the transmitting path and the receiving path. That is, the TDD switch 240 forms the transmitting path to transfer the transmitting signal. At this time, the TDD switch 240 further forms an absorption path for blocking a reflecting signal in the transmitting signal reversely provided to the transmitting path. Here, the TDD switch 240 diverges the absorption path from the transmitting path. That is, the TDD switch 249 has an isolation function. Further, the TDD switch forms the receiving path to transfer a received signal. Moreover, the TDD switch 240 blocks electric connection between the transmitting path and the receiving path. In other words, the TDD switch 240 is implemented to perform a combination function of the isolator 130 and the TDD switch 140 shown in FIG. 1.

To do this, the TDD switch 240 includes a circulator 241, a Triple Junction 243, a transmission (Tx) Matched Switch Circuit (TMSC) 245, a reflection removing unit 246, a reception (Rx) Matched Switch Circuit (RMSC) 247, and a TDD Switch Control Circuit (TSCC) 249.

The circulator 241 provides a transmitting signal to the transmitting path and provides a reflecting signal to the absorption path. Further, the circulator 241 provides a received signal to the receiving path. The circulator 241 is disposed at a diverged point of the absorption path from the transmitting path. At this time, the circulator 241 may include a plurality of circulation terminals $C_1$, $C_2$, and $C_3$. The circulator 241 circulates the transmitting signal through a terminal pair to provide a transmitting signal, a reflecting signal, or a receiving signal. In this case, the terminal pair is composed to two circulation terminals of the circulator 241. Here, the circulator 241 electrically blocks the transmitting path from the absorption path or the receiving path. Through this, the circulator 241 may prevent the reflecting signal or the receiving signal from being reversely introduced to the transmitting path.

For example, if a transmitting signal is received through a first circulation terminal $C_1$, the circulator 241 circulates and provides the transmitting signal to a second circulation terminal $C_2$ forming a terminal pair with the first circulation terminal $C_1$ to the transmitting path. Meanwhile, if a reflecting signal is received through a second circulation terminal $C_2$, the circulator 241 circulates and provides the reflecting signal to a third circulation terminal $C_3$ forming a terminal pair with the second circulation terminal $C_2$ to the absorption path. if a receiving signal is received through a second circulation terminal $C_2$, the circulator 241 circulates and provides the receiving signal through a third circulation terminal $C_3$ forming a terminal pair with the second circulation terminal $C_2$ to the receiving path.

The triple junction 242 transfers the reflecting signal to the absorption path. Further, the triple junction 242 transfers the receiving signal to the receiving path. The triple junction diverges the absorption and the receiving path from each other. That is, the triple junction 243 is disposed at a diverged point of the absorption path and the receiving path. At this time, the triple junction 243 may include connecting terminals $J_1$, $J_2$, and $J_3$. Further, the triple junction 243 provides the reflecting signal or the receiving signal. Here, the triple junction 243 electrically blocks the absorption path and the receiving path from each other. Through this, the triple junction 243 may prevent the reflecting signal from being introduced to the receiving path or the receiving signal from being introduced to the absorption path.

For example, if the receiving signal is received through the first connecting terminal $J_1$, the triple junction 243 transfers the receiving signal to the receiving path through the second connecting terminal $J_2$. Meanwhile, if the reflecting signal is received through the first connecting terminal $J_1$, the triple junction 243 transfers the reflecting signal to the reflecting path through the third connecting terminal $J_3$.

The TMSC 245 is disposed in the absorption path, and absorbs the reflecting signal. That is, if the triple junction 243 receives the reflecting signal from the triple junction 243, the TMSC 245 absorbs and transfers the reflecting signal. Further, the TMSC 245 blocks introduction of the receiving signal. At this time, the TMSC 245 may be configured by at least one Positive Intrinsic Negative (PIN) diode. That is, if the PIN diode is turned-on, the TMSC 245 is activated. Conversely, if the PIN diode is turned-off, the TMSC 245 is inactivated. Here, a configuration of the TMSC 245 will be described with reference to FIG. 4 in detail.

The reflection removing unit 246 connects with the TMSC 245 to remove the reflecting signal. At this time, the reflection removing unit 246 is disposed at an end part of the absorption path. That is, if the TMSC 245 receives the reflecting signal, the reflection removing unit 246 removes the reflecting signal.

The RMSC 247 is disposed on the receiving path to pass the receiving signal. That is, if the triple junction 243 receives the receiving signal from the triple junction 243, the RMSC 247 transfers the receiving signal to the LNA 270. Further, the RMSC 247 blocks introduction of the reflecting signal. At this time, the RMSC 247 may be configured by at least one PIN diode. That is, if the PIN diode is turned-on, the RMSC 247 is activated. Conversely, if the PIN diode is turned-off, the RMSC 247 is inactivated. Here, a configuration of the RMSC 247 will be explained with reference to FIG. 3 in detail.

The TSCC 249 controls an operation of the TDD switch 240. At this time, the TSCC 249 controls driving of the TMSC 245 and the RMSC 247. That is, in a transmitting mode, the TSCC 249 inactivates the TMSC 245 to absorb the reflecting signal and activates the RMSC 247 to block introduction of the reflecting signal. Further, in the receiving mode, the TSCC 249 activates the TMSC 245 to block introduction of the receiving signal and inactivates the RMSC 247 to pass the receiving signal. At this time, the TSCC 249 may activate or inactivate the TMSC 245 using a transmission (Tx) matched switch Control Signal (TCS). Further, the TSCC 249 may activate or inactivate the RMSC 247 using a reception (Rx) matched switch Control Signal (RCS).

The TDD filter 250 filters the transmitting signal to a certain frequency domain. The TDD filter 250 filters the receiving signal to a certain frequency domain. The TDD antenna 260 transmits the transmitting signal in a wireless scheme. The TDD antenna 260 transmits the receiving signal in a wireless scheme. That is, a transmitting signal is transferred through the transmitting path, the TDD antenna 260 transmits the transmitting signal in a wireless scheme. Further, if the receiving signal is received by the TDD antenna 160 in a wireless scheme, it transfers the receiving signal via the receiving path.

The LNA 270 amplifies the receiving signal. At this time, the LNA 270 suppresses a noise included in the receiving signal. Further, the LNA 270 up-converts a frequency of a receiving signal.

The receiver 280 processes the receiving signal. At this time, the receiver 280 may decode and demodulate the receiving signal. Here, the receiver 280 may include a decoder and a demodulator.

A mode controller 291 recognizes a current communication mode of the communication terminal 200 to control the TDD switch 240. That is, in the transmitting mode, the mode controller 291 controls the TSCC 249 to be driven corresponding to the transmitting mode. In the receiving mode, the mode controller 291 controls the TSCC 249 to be driven corresponding to the receiving mode. At this time, the mode controller 291 may control the TDD switch 249 using a TDD switch TDD Signal (TTS). Furthermore, the mode controller 291 controls the RFPA 220 according to a current communication mode. That is, in the transmitting mode, the mode controller 291 controls the RFPA 220 to be turned-on. Moreover, in the receiving mode, the mode controller 291 controls the RFPA 220 to be turned-off. At this time, the mode controller 291 may control the RFPA 220 using an RFPA TDD Signal (RTS).

A drive determining unit 293 recognizes an operation state of a TDD switch 240 according to a current communication mode of the communication terminal 200 to determine whether the RFPA 200 is driven. That is, in the transmitting mode, the drive determining unit 293 may determine whether the TDD switch 240 normally operates according to presence of activation of the TMSC 245 or the RMSC 247. Here, the drive determining unit 293 may analyze and compares the RFPA TDD Signal (RTS) of the mode controller 291 and a reception (Rx) matched switch status Monitor Signal (RMS) of the TDD switch 240 to determine whether the RFPA 200 is driven. At this time, if it is determined that the TDD switch 240 normally operates, the drive determining unit 293 turns-on the RFPA 200. Conversely, if it is determined that the TDD switch 240 abnormally operates, the drive determining unit 293 disregards control of the mode controller 291 and turns-off the RFPA 200. In addition, in the receiving mode, the drive determining unit 293 turns-off the RFPA 200. Here, the drive determining unit 293 turns-on/off the RFPA 220 using an RFPA TDD signal for LNA Protection (RLP).

Figure 3:
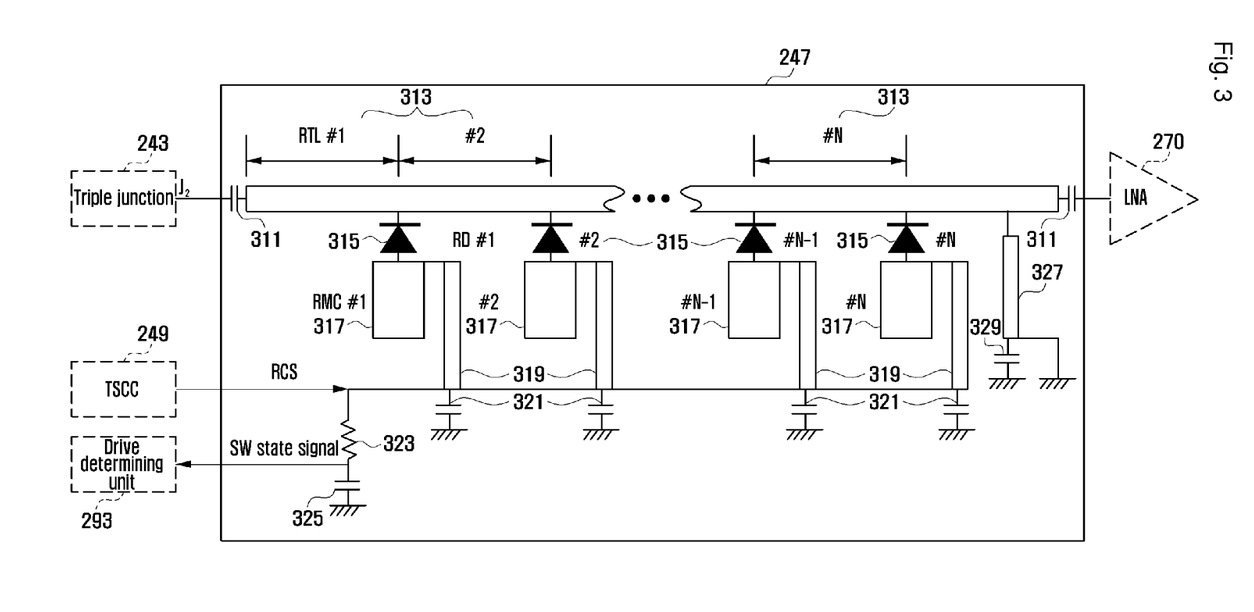
FIG. 3 is a block diagram illustrating a configuration of a reception matched switch circuit (RMSC) shown in FIG. 2.

FIG. 3 is a block diagram illustrating a configuration of an RMSC 247 shown in FIG. 2.

Referring to FIG. 3, the RMSC 247 of this embodiment includes input/output capacitors 311, a reception (Rx) Transmission Line (RTL) 313, an Rx PIN Diode (RD) 315, an Rx Matching Circuit (RMC) 317, a Bias Transmission Line (BTL) 319, a bias capacitor 321, a signal detection resistor 323, a signal detection capacitor 325, a Ground Transmission Line (GTL) 327, and a ground capacitor 329.

The input/output capacitors 311 are disposed at both ends of the RMSC 247, respectively. The input/output capacitors 311 blocks direct current (DC) power.

The RTL 313 is disposed at both ends of the RMSC 247. The RTL 313 transfers a receiving signal from the triple junction 243 to the LNA 270. That is, the RTL 313 physically connects the triple junction 243 and the LNA 270 to provide the receiving path. At this time, N RTLs 313 may be serially connected to each other.

The RD 315 connects with the RTL 313. The RD 315 supports such that the RTL 313 passes the receiving signal and blocks introduction of the reflecting signal. The RD 315 blocks electric connection between the ripple junction 243 and the LNA 270 to block introduction of the reflecting signal in an on state. Here, when the triple junction 243 receives the reflecting signal, the RD 315 reversely reflects the reflecting signal. The RD 315 electrically connects the ripple junction 243 and the LNA 270 to pass the receiving signal. At this time, N RDs 315 may be provided in parallel to connect with the RTL 313.

The RMC 317 connects with the RD 315. The RMC 317 supports impedance matching of the RD 315. At this time, the RMC 317 may be configured by a transmission line (not shown) having certain impedance and electric length, and a capacitor (not shown). Further, n RMCs 317 may be provided to independently connect with the RD 315.

N receiving support cells may be formed in the RMSC 247 by a combination of the RTL 313, the RD 315, and the RMC 317. Here, in respective receiving support cells, the RTL 313 and the RMC 317 may be configured by a configuration for removing parasitic components. That is, in respective receiving support cells, parasitic components of the RD 315 may be removed according to the size of the RTL 313. Further, in respective receiving support cells, parasitic components of the RD 315 may be removed according to at least one of impedance of the RMC 317 and the size of a transmission line. In other words, the parasitic components of the RD 315 may be removed according to at least one of the RTL 313 or the RMC 317 determined at the manufacturing time thereof. Through this, insertion loss due to the RD in the RMSC 247 may be suppressed.

The BTL 319 connects with the RD 315 and the TSCC 249. The BTL 319 provides operation power for on/off of the RD 315. The BTL 319 provides operation power to an anode of the RD 315 according to a reception Rx matched switch control signal RCS of the TSCC 249. At this time, N BTLs 319 may be provided to independently connect with the RD 315, respectively.

The bias capacitor 321 connects with the BTL 319. The bias capacitor 321 supports such that the BTL 319 provides operation power to the RD 315. At this time, N bias capacitors 321 may be provided to independently connect with the BTL 319, respectively.

The signal detection resistor 323 is connected between the TSCC 249 and the BTL 319. The signal detection resistor 323 detects a reception Rx matched switch control signal RCS of the TSCC 249. Further, the signal detection resistor 323 transfers a switch state signal corresponding to the reception Rx matched switch control signal RCS to the drive determining unit 293.

The signal detection capacitor 325 connects with the signal detection resistor 323. The signal detection capacitor 325 supports such that the signal detection resistor 323 detects the receiving control signal.

The GTL 327 connects with an end of the RTL 313. The GTL 327 grounds a cathode of the RD 315 to a ground. The GTL 317 suppresses the receiving signal to be introduced to the ground.

The ground capacitor 329 connects with the GTL 327. The ground capacitor 329 suppresses the receiving signal to be introduced in the GTL 327.

Figure 4:
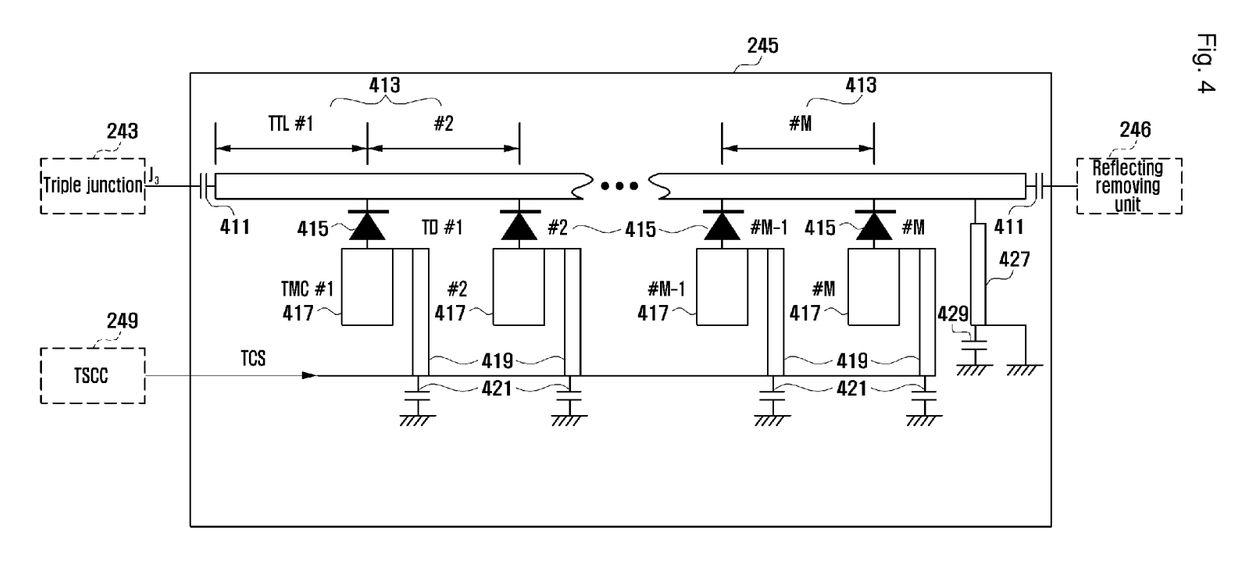
FIG. 4 is a block diagram illustrating a configuration of a transmission matched switch circuit (TMSC) shown in FIG. 2.

FIG. 4 is a block diagram illustrating a configuration of a TMSC shown in FIG. 2.

Referring to FIG. 4, the TMSC 245 of this embodiment includes input/output capacitors 411, a Transmission (Tx) transmission Line (TTL) 413, a transmission (Tx) PIN Diode (TD) 415, and a transmission (Tx) Matching Circuit (TMC) 417.

The input/output capacitors 411 are disposed at both ends of the TMSC 245, respectively. The input/output capacitors 411 block DC power.

The TTL 413 is disposed at both ends of the TMSC 245. The TTL 413 transfers from the triple junction 243 to a reflection removing unit 246. That is, the TTL 413 physically connects the triple junction 243 and the reflection removing unit 246 to provide the absorption path. At this time, M TTLs 413 may be provided to serially connect with each other.

The TD 415 connects with the TTL 413. The TD 415 supports such that the TTL 413 to absorb the reflecting signal and to block introduction of the receiving signal. The TD 415 blocks electric connection between the triple junction 243 and the reflection removing unit 246 to block introduction of the receiving signal in an on state. Here, when the triple junction 243 receives the receiving signal from the triple junction 243, the TD 415 reversely reflects the receiving signal. Further, the TD 415 electrically connects the triple junction 243 and the reflection removing unit 246 to absorb the reflecting signal. At this time, m TDs 415 may be provided to connect with the TTL 413 in parallel, respectively.

The TMC 417 connects with the TD 415. The TMC 417 supports impedance matching of the TD 415. At this time, the TMC 417 may be configured by a transmission line (not shown) having certain impedance and an electric length and a capacitor (not shown). Further, M TMCs 417 may be provided to independently connect with the TD 415, respectively.

At this time, M transmission support cells may be formed in the TMSC 245 according to a combination of the TTL 413, the TD 415, and the TMC 417. Here, in the respective transmission support cells, the TTL 413 and the TMC 417 may be configured by a structure for removing parasitic components of the TD 415. That is, in respective transmission support cells, parasitic components of the TD 415 may be removed according to the size of the TTL 413. Further, in respective transmission support cells, parasitic components of the TD 415 may be removed according to at least one of impedance of the TMC 417 and the size of a transmission line. In other words, parasitic components of the TD 415 may be removed according to at least one of the TTL 413 or the TMC 417 determined at the manufacturing time thereof. This may suppress insertion loss due to the TD 415 in the TMSC 245.

The bias transmission line 419 connects with the TD 415 and a TSCC 249. The bias transmission line 419 provides operation power for on/off of the TD 415. That is, the bias transmission line 419 provides operation power to an anode of the TD 415 according to a transmission Tx matched switch control signal TCS of the TSCC 249. At this time, M bias transmission lines 419 may be provided to independently connect with the TD 415, respectively.

The bias capacitor 421 connects with the bias transmission line 419. The bias capacitor 421 supports such that the bias transmission line 419 provides operation power to the TD 415. At this time, M bias capacitors 421 may be provided to independently connect to the bias transmission lines 419, respectively.

The ground transmission line 427 connects with an end of the TTL 413. The ground transmission line 427 grounds a cathode of the TD 415 to a ground. Further, the ground transmission line 427 suppresses the reflecting signal to be introduced to the ground.

The ground capacitor 429 connects with the ground transmission line 427. The ground capacitor 429 supports such that the ground transmission line 427 to suppress introduction of the reflecting signal.

Figure 5:
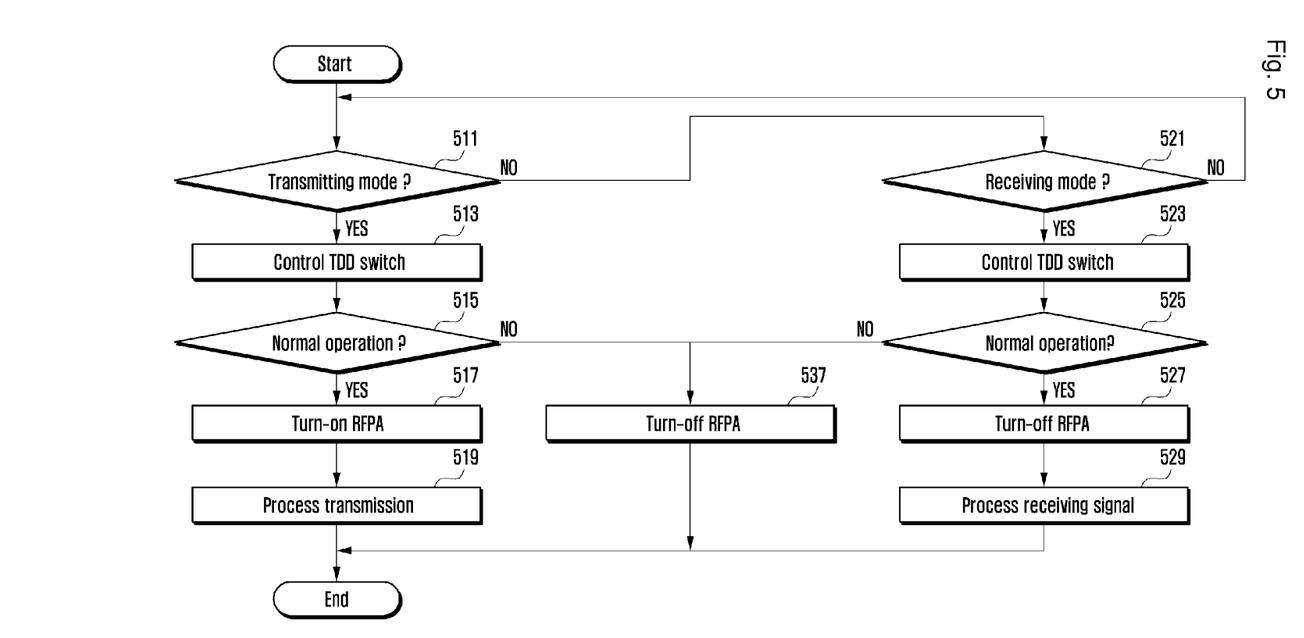
FIG. 5 is a flowchart illustrating a driving method of a communication terminal according to an exemplary embodiment of the present invention.

FIG. 5 is a flowchart illustrating a driving method of a communication terminal according to an exemplary embodiment of the present invention.

Referring to FIG. 5, in a driving method of a communication terminal of this embodiment, a mode controller 291 firstly recognizes a current communication mode of a communication terminal 200. That is, the mode controller 291 determines whether a current communication mode of the communication terminal 200 is a transmitting mode (511). When the current communication mode of the communication terminal 200 is the transmitting mode at step 511, the mode controller 291 controls a TDD switch 240 to be driven corresponding to the transmitting mode (513).

At this time, the mode controller 291 may transmit a TDD switch TDD Signal (TTS) for reporting that the current communication mode is the transmitting mode to a TSCC 249. Meanwhile, the mode controller 291 may transmit an RFPA TDD Signal (RTS) for reporting that the current communication mode is the transmitting mode to the drive determining unit 293. The RTS may be a signal for turning-on an RFPA 220 by the mode controller 291.

Next, when the mode controller 291 receives the TTS, the TSCC 249 analyzes the TTS to recognize that the current communication mode is the transmitting mode. Further, the TSCC 249 inactivates the TMSC 245 but activates the RMSC 247. That is, the TSCC 249 transmits a transmission control signal to the TMSC 245 such that the TMSC 245 turns-off the TD 415. If receiving the transmission control signal, the TMSC 245 turns-off the TD 415. Further, the TSCC 249 transmits a receiving control signal to the RMSC 247 such that the RMSC 247 turns-on the RD 315. Here, if receiving the RCS, the RMSC 247 turns-on the RD 315. Furthermore, the RMSC 247 transmits a switch state signal for reporting an operation state of the TDD switch 240 corresponding to the RCS. Here, the switch state signal may be a signal indicating presence of activation of the RMSC 247.

Subsequently, the drive determining unit 293 determines whether the TDD switch 240 normally operates corresponding to a current communication mode of the communication terminal 200 (515). At this time, the drive determining unit 293 may determine whether the TDD switch 240 normally operates according to presence of activation of the RMSC 247. That is, the drive determining unit 293 recognizes that a current communication mode of the communication terminal 200 is a transmitting mode based on an RTS of the mode controller 291. Further, the drive determining unit 293 recognizes an operation state of the TDD switch 240 based on a switch state signal of the TSCC 249. In other words, the drive determining unit 293 determines whether the RMSC 247 is activated. Here, if it is determined that the RMSC 247 is activated, the drive determining unit 293 determines that the TDD switch 240 normally operates. Meanwhile, if it is determined that the RMSC 247 is inactivated, the drive determining unit 293 determines that the TDD switch 240 abnormally operates.

If it is determined at step 515 that the TDD switch 240 normally operates corresponding to the current communication mode of the communication terminal 200, the drive determining unit 293 turns-on the RFPA 220 (517). At this time, the drive determining unit 293 may transmit a drive determining signal for turning-on the RFPA 220 to the RFPA 220. Next, the communication terminal 200 processes and transmits the transmitting signal through the transmitting path in a wireless scheme, and finishes a driving procedure.

That is, the transmitter 210 generates a transmitting signal, and the RFPA 220 amplifies the transmitting signal. If the RFPA 220 receives the transmitting signal, a circulator 241 of the TDD switch 240 transfers the transmitting signal to the TDD filter 250. If the TDD switch 240 receives the transmitting signal, the TDD filter 250 filters the transmitting signal to a certain frequency domain, and the TDD antenna 260 transmits the transmitting signal in a wireless scheme.

In the meantime, if a reflecting signal is reversely transferred to a transmitting path between the circulator 241 and the TDD antenna 260, a circulator 241 of the TDD switch 240 transfers the reflecting signal to the triple junction 243. At this time, the RMSC 247 is activated to be electrically closed. The TMSC 245 is inactivated to be electrically open. Accordingly, if the circulator 241 receives the reflecting signal, the triple junction 243 transfers a reflecting signal to the TMSC 245. Furthermore, if the triple junction 243 receives the reflecting signal, the TMSC 245 transfers the reflecting signal to a reflection removing unit 246 through the TTL 413, and the reflection removing unit 246 removes the reflecting signal.

In the meantime, if it is determined at step 511 that the current communication mode of the communication terminal 200 is not the transmitting mode, the mode controller 291 determines whether the current communication mode is a receiving mode (521). If it is determined at step 521 that the current communication mode of the communication terminal 200 is the receiving mode, the mode controller 291 controls the TDD switch 240 to be driven corresponding to the receiving mode (523).

At this time, the mode controller 291 may transmit a TDD switch TDD Signal (TTS) for reporting that the current communication mode is the receiving mode to a TSSC 249 of the TDD switch 240. Further, the mode controller 291 may transmit an RFPA TDD Signal (RTS) for reporting that the current communication mode is the receiving mode to the drive determining unit 293. Here, the RTS may be a signal for turning-off the RFPA 291 by the mode controller 291.

If the mode controller 291 receives a TTS, the TSCC 249 analyzes the TTS to recognize that the current communication mode is the receiving mode. Further, the TSCC 249 activates the TMSC 245 but inactivates the RMSC 247. That is, the TSCC 249 transmits a transmission control signal for turning-on the TD 415 to the TMSC 245. Here, if receiving the transmission control signal, the TMSC 245 turns-on the TD 415. In addition, the TSCC 249 transmits a receiving control signal for turning-off the RD 315 to the RSMC 247. Here, if receiving the receiving control signal, the RMSC 247 turns-off the RD 315. In addition, the RMSC 247 transmits a switch state signal for reporting an operation state of the TDD switch 240 corresponding to the Rx matched switch control signal RCS to the drive determining unit 293. Here, the switch state signal may be a signal indicating presence of activation of the RMSC 247.

Next, the drive determining unit 293 determines whether the TDD switch 240 normally operates corresponding to a current communication mode of the communication terminal 200 (525). At this time, the drive determining unit 293 may determine whether the TDD switch 240 normally operates according to presence of activation of the RMSC 247. That is, the drive determining unit 293 recognized that the current communication mode of the communication terminal 200 is the receiving mode based on an RTS of the mode controller 291. Further, the drive determining unit 293 recognizes an operation state of the TDD switch 240 based on a switch state signal of the TSCC 249. In other words, the drive determining unit 293 determines whether the RMSC 247 is activated. Here, if it is determined that the RMSC 247 is inactivated, the drive determining unit 293 determines that the TDD switch 240 normally operates. Further, if it is determined that the RMSC 247 is activated, the drive determining unit 293 determines that the TDD switch 240 abnormally operates.

If it is determined that the TDD switch 240 normally operates corresponding to a current communication mode of the communication terminal 200, the drive determining unit 293 turns-off the RFPA 220 (527). At this time, the drive determining unit 293 may transmit a drive determining signal for turning-off the RFPA 220 to the RFPA 220. Next, the communication terminal 200 receives the receiving signal in a wireless scheme, processes it through the receiving path, and then finishes the driving procedure.

That is, the TDD antenna 260 receives the receiving signal in a wireless scheme, and the TDD filter 250 filters the receiving signal to a certain frequency domain. Further, if the TDD filter 250 receives the receiving signal, the circulator 241 of the TDD switch 240 transfers the receiving signal to the triple junction 243. At this time, the TMSC 245 is activated to be electrically closed. The RMSC 247 is inactivated to be electrically open. Accordingly, if the circulator 241 receives the receiving signal, the triple junction 243 transfers the receiving signal to the RMSC 247. Furthermore, if the triple junction 243 receives the receiving signal, the RMSC 247 transfers the receiving signal to the LNA 270 through the RTL 313. Furthermore, if the RMSC 247 receives the receiving signal, the LNA 270 amplifies the receiving signal, and the receiver 280 processes the receiving signal.

Meanwhile, if it is determined that the TDD switch 240 normally operates corresponding to the current communication mode of the communication terminal 200 at step 515 or 525, the drive determining unit 293 turns-off the RFPA 220 (537) and the driving procedure is terminated. At this time, the drive determining unit 293 may transmit a drive determining signal for turning-off the RFPA 220 to the RFPA 200.

In the meantime, the foregoing embodiment has illustrated that the drive determining unit 293 determines whether the TDD switch 240 normally operates according to presence of activation of the RMSC 247. However, the present invention is not limited thereto. For example, although the drive determining unit 293 determines whether the TDD switch 240 normally operates according to presence of activation of the TMSC 243, the present invention may be implemented. Meanwhile, although the drive determining unit 293 receives a separate message from the TSCC 249 to determine whether the TDD switch 240 normally operates, the present invention may be implemented.

In an embodiment of the present invention, in a communication terminal in a transmitting mode, the TDD switch may diverge an absorption path from a transmitting path and remove a reflecting signal in a transmitting signal reversely transferred to the transmitting path through an absorption path to protect an RFPA of the transmitting path from the reflecting signal. In a transmitting mode of the communication terminal, the TDD switch may isolate a receiving path from the transmitting path and the absorption path to protect an RFPA of the receiving path from a transmitting signal or a reflecting signal. This may improve transmitting performance of the communication terminal. Further, in a receiving mode of the communication terminal, a TDD switch may isolate a transmitting path and an absorption path from a receiving path to protect an RFPA of the receiving path from a noise introduced from the transmitting path. This may improve receiving performance of the communication terminal.

Moreover, when the TDD switch abnormally operates in a transmitting mode, the communication terminal may turn-off an RFPA of a transmitting path to protect not only an RFPA from a reflecting signal but also an LNA from a transmitting signal or the reflecting signal. Furthermore, the communication terminal may turn-off an RFPA of a transmitting path in a receiving mode to protect the RFPA from a noise introduced from the transmitting path. This may improve receiving performance of the communication terminal.

Therefore, because a TDD switch has an isolation function in the communication terminal, there is not a need for a separate isolator to suppress insertion loss on a transmitting path. Owing to this, the communication terminal may reduce power for output of an RFPA. In addition, this may reduce power consumption required for an operation of the communication terminal and a calorific value according to an operation of the communication terminal.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A communication terminal comprising:
   an antenna configured to transmit a transmitting signal and receive a receiving signal in a wireless scheme;
   a transmitter configured to transmit the transmitting signal to the antenna;
   a receiver configured to receive the receiving signal from the antenna; and
   a transceive switch disposed between the transmitter and the receiver, and blocking electric connection between the transmitter and the receiver,
   wherein the transceive switch forms a transmitting path between the transmitter and the antenna in a transmitting mode, includes a circulator diverging an absorption path for blocking a reflecting signal in the transmitting signal reversely transferring to the transmitting path from the transmitting path, and forms a receiving path connecting the antenna and the receiver via the circulator when in a receiving mode, and
   wherein the transceive switch comprises a transmission matched switch circuit inactivated in the transmitting mode for controlling the circulator to absorb the reflecting signal, but activated in the receiving mode for controlling the circulator to cut-off introduction of the receiving signal.

2. A communication terminal comprising:
   a transmitter configured to transmit a transmitting signal to an antenna;
   a receiver configured to receive a receiving signal from the antenna; and
   a transceive switch disposed between the transmitter and the receiver, and blocking electric connection between the transmitter and the receiver,
   wherein the transceive switch forms a transmitting path between the transmitter and the antenna in a transmitting mode, includes a circulator diverging an absorption path for blocking a reflecting signal in the transmitting signal reversely transferring to the transmitting path from the transmitting path, and forms a receiving path connecting the antenna and the receiver via the circulator when in a receiving mode, and
   wherein the transceive switch comprises a reception matched switch circuit activated in the transmitting mode to block introduction of the reflecting signal, but inactivated in the receiving mode to pass the receiving signal through the receiving path.

3. The communication terminal of claim 1, wherein the transmission matched switch circuit comprises:
   at least one PIN diode turned-on in the transmitting mode but turned-off in the receiving mode;
   at least one transmission line transferring the reflecting signal to the at least one PIN diode; and
   at least one matching circuit for matching respective impedances of the at least one PIN diode,
   wherein the transmission line and the matching circuit are configured by a structure for removing parasitic components of the PIN diode.

4. The communication terminal of claim 2, wherein the reception matched switch circuit comprises:
   at least one PIN diode turned-on in the receiving mode and turned-off in the transmitting mode;
   at least one transmission line transferring the receiving signal to the at least one PIN diode; and
   at least one matching circuit for matching respective impedances of the at least one PIN diode,
   wherein the transmission line and the matching circuit are configured by a structure for removing parasitic components of the PIN diode.

5. The communication terminal of claim 2, further comprising a drive determining unit turning-on the transmitter when the reception matched switch circuit is activated, and turning-off the transmitter when the reception matched switch circuit is inactivated.

6. A driving method of a communication terminal comprising:
- forming a transmitting path and an absorption path by controlling a transceive switch in a transmitting mode to isolate the transmitting path and a receiving path from the absorption path, the transmitting path transmitting a transmitting signal in a wireless scheme, and the absorption path diverged from the transmitting path through a circulator of the transceive switch to block a reflecting signal in the transmitting signal reversely transferred to the transmitting path;
- processing the transmitting signal through the transmitting path;
- controlling the transceive switch to form the receiving path from the circulator such that the transmitting signal is blocked in the transmitting path and the absorption path when the transmitting mode is converted to a receiving mode;
- processing a receiving signal received through the receiving path,
- wherein forming the transmitting path and the absorption path comprises inactivating a transmission matched switch circuit such that the circulator absorbs the reflecting signal, and activating a reception matched switch circuit to block introduction of the reflecting signal, in the transmitting mode.

7. The method of claim 6, wherein the transmission matched switch circuit is disposed on the absorption path and the reception matched switch circuit disposed on the receiving path.

8. The method of claim 6, wherein forming the receiving path comprising activating the transmission matched switch circuit such that the circulator blocks introduction of the receiving signal, and inactivating the receiving matched switch circuit such that the circulator passes the receiving signal.

9. The method of claim 6, wherein the transmission matched switch circuit comprises:
- at least one PIN diode turned-on in the transmitting mode but turned-off in the receiving mode;
- at least one transmission line transferring the reflecting signal to the at least one PIN diode; and
- at least one matching circuit for matching respective impedances of the at least one PIN diode,
- wherein the transmission line and the matching circuit are configured by a structure for removing parasitic components of the PIN diode.

10. The method of claim 6, wherein the reception matched switch circuit comprises:
- at least one PIN diode turned-on in the receiving mode and turned-off in the transmitting mode;
- at least one transmission line transferring the receiving signal to the at least one PIN diode; and
- at least one matching circuit for matching respective impedances of the at least one PIN diode,
- wherein the transmission line and the matching circuit are configured by a structure for removing parasitic components of the PIN diode.

11. The method of claim 6, further comprising:
- determining whether the receiving path is blocked from the transmitting path and the absorption path in the transmitting mode; and
- turning-on a transmitter for processing the transmitting signal when the receiving path is blocked, and turning-off the transmitter when the receiving path is not blocked.

12. The method of claim 6, further comprising:
- turning-on a transmitter for processing the transmitting signal in the receiving mode.

* * * * *